United States Patent

[11] 3,602,934

| | | |
|---|---|---|
| [72] | Inventor | Bryant B. Reed<br>Fort Worth, Tex. |
| [21] | Appl. No. | 889,020 |
| [22] | Filed | July 31, 1969 |
| [45] | Patented | Sept. 7, 1971 |
| [73] | Assignee | Acushnet Company |

[54] RESILIENT PLUG FOR CLEANING PIPELINES
9 Claims, 1 Drawing Fig.

[52] U.S. Cl. ..................................................... 15/104.06 R
[51] Int. Cl. ........................................................ B08b 9/04
[50] Field of Search............................................ 15/104.06,
104.06 A, 3.5; 137/238

[56] References Cited
UNITED STATES PATENTS

| | | | |
|---|---|---|---|
| 3,389,417 | 6/1968 | Knapp et al................... | 15/104.06 |
| 3,403,418 | 10/1968 | Knapp et al................... | 15/104.06 |

*Primary Examiner*—Edward L. Roberts
*Attorney*—Eyre, Mann & Lucas

ABSTRACT: An improved pipe-cleaning resilient plug is provided which comprises an elastomeric shell with at least one opening therein and an elastomeric foam filler positioned within the shell.

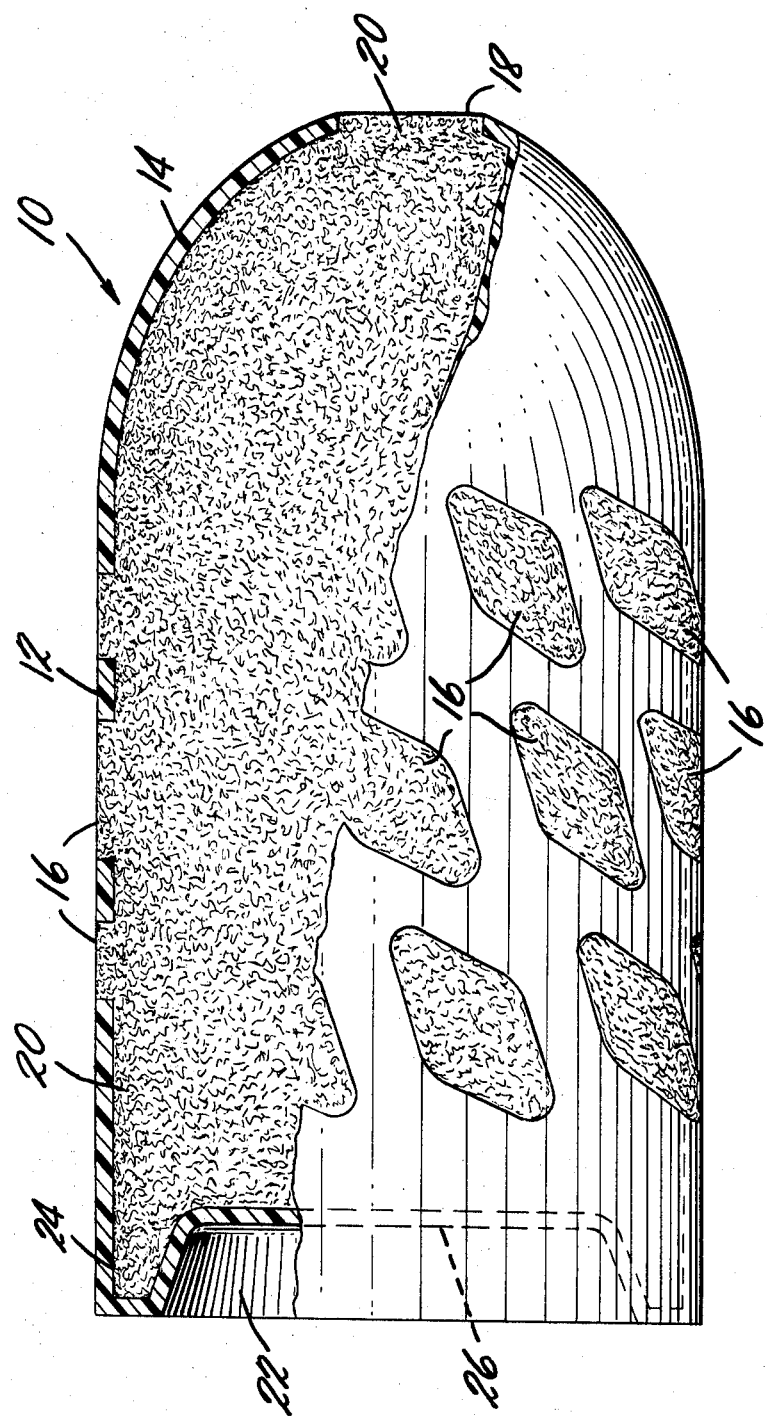
INVENTOR.
BRYANT B. REED
BY
ATTORNEYS.

RESILIENT PLUG FOR CLEANING PIPELINES

The present invention is directed to an improved plug of the type used in cleaning pipelines. The plug of the present invention comprises a tubular casing of elastomeric material closed at the front with a rounded nose section which in the preferred structure has an opening for entry of fluid. The casing is closed at the rear preferably with a contoured tail section in which the central area is recessed so that the trailing end portion of the tubular casing is in the form of an annular flange. The wall of the tubular casing has openings therein and the casing is filled with an elastomeric foam.

In use the plug is inserted into one end of a pipeline and then fluid under pressure is applied to drive the plug along to clean the pipe. The pipe is best cleaned when the outside diameter of the plug is slightly larger than the inside diameter of the pipe. In this way, the plug will press out against the pipe to scour the inside wall. The outside diameter of the plug is preferably made large enough to establish a fluid seal with the pipe wall and this assists in generating the force required for driving the plug through the pipe line. If desired, cutting abrasives may be positioned at the surface of the plug.

Pipelines do not have a uniform inside diameter since sections of pipe with different inside diameter are frequently used in the line and the inside diameter will also vary due to accumulated scale and other debris. There are also bends, right-angle turns, and cross tees in the pipeline which the plug must safely maneuver as it moves through the pipe. These obstacles in the pipeline tend to tear or otherwise damage the known cleaning plugs which have not therefore been entirely satisfactory.

The plug of the present invention is well designed to overcome the obstacles encountered in a pipeline. The tubular body and the nose and tail sections comprise a unitary body made of a tough elastomeric material that will withstand abuse and provide a strong protective shell for the elastomeric foam filler. The foam filler in turn gives the resilience necessary for the plug to yield and change shape and thereby adjust to the obstacles encountered in the pipeline without substantial damage to the plug. At the same time, the foam reinforces and presses the shell of the plug out against the pipe with the desired force for scouring the wall of the pipe. Any of the known elastomers can be employed in the structure of the present invention but best results are achieved by using a polyurethane casing and a polyurethane foam filler.

Further details and advantages of the structure of the present invention may be readily understood by reference to the preferred embodiment shown in the drawing.

Casing 10 of the plug shown in the drawing comprises a hollow tubular body 12 and a rounded nosepiece section 14 of polyurethane molded in a single operation in one unitary piece. The rounded nosepiece shown in the drawing is molded in a parabolic curve which has been found to be ideal for maneuvering the plug past obstacles in the pipeline. Openings 16 are molded into the straight wall of the body of the tube. The openings are preferably diamond shaped and arranged in a helical spiral pattern along the straight wall of the tube for maximum scouring action. In order to add to the flexibility and the maneuverability of nosepiece 14 an opening 18 is molded into the front end thereof. As to proportions, the overall length of casing 10 is preferably made about twice as long as the diameter and with an overall length of 8½ inches the wall of the casing is about ⅛-inch thick.

For maximum scouring action, the polyurethane foam filler is extended into openings 16 and 18 and molded flush with the exterior surface of the casing. The molded tubular wall and nosepiece of casing 10 is therefore placed in a second mold (not shown) which conforms to the exterior shape of these members and the hollow tube and openings 16 and 18 are filled with a polyurethane foam 20. The polyurethane may be foamed in situ in casing 10 or it may be blown into the mold in known manner. It is of advantage to use a porous foam rather than a unicell type of foam since gases and liquids encountered in the pipeline will readily move into and out of the porous foam as the plug contracts and expands as it passes obstacles in the pipeline.

It is also of advantage to mold a recess 22 into the central area of the foam filler at the open end of the tube of casing 10 so that the foam is in the form of an annular flange 24 that is positioned against the wall of the tube. When this is done, the annular flange of foam 24 in the sealed casing will readily neck down to prevent the trailing edge of the casing from being torn or damaged in passing obstacles in the pipeline.

After the foam filler is molded in place, the section of the mold (not shown) that covers the open end of casing 10 is removed and a conventional mold attachment (not shown) is inserted into the open end of casing 10 in order to mold a solid polyurethane wall 26 across the open end of the casing in contact with the foam filler and the end portion inside the wall of the tube. The solid polyurethane wall 26 seals the trailing end of casing 10 to complete the protective shell which thereby becomes a unitary molded piece. The solid polyurethane wall 26 is preferably made of the same material that was used in the tubular wall and it is preferably of equal thickness. In use fluid under pressure is applied against the solid wall 26 in order to drive the plug through the pipeline.

While it is of economic advantage to mold the parts of the pipe-cleaning plug of the present invention as described hereinabove, it will be understood that the parts thereof can be fabricated separately and assembled with an adhesive in known manner to form the casing with the foam filler of the present invention. When the foam filler is separately molded and inserted into the casing, the foam need not extend into the openings 16 and 18 as it does in the preferred structure.

It will be understood that it is intended to cover all changes and modifications of the preferred illustrative embodiment of the invention which do not constitute a departure from the spirit and scope of the invention.

What is claimed is:

1. An improved pipe-cleaning resilient plug which comprises an elastomeric tubular casing with a nosepiece across one end thereof and a solid wall across the second end thereof, an elastomeric foam filler positioned within said casing and at least one opening located in a wall of said casing other than in the solid wall across the second end thereof, and wherein the said elastomeric foam filler extends into the openings at least to the exterior surface of the wall of the casing in its uncompressed state whereby a pipe of the same interior diameter as the exterior diameter of the plug is contacted by the said filter.

2. A structure as specified in claim 1 in which the elastomeric material is polyurethane.

3. A structure as specified in claim 1 in which the nosepiece is rounded in a parabolic curve.

4. A structure as specified in claim 1 in which an opening is positioned in the front end of said nosepiece.

5. A structure as specified in claim 1 in which the casing is a molded unitary piece.

6. A structure as specified in claim 1 in which there are a plurality of openings and in which the foam filler is porous.

7. An improved pipe-cleaning resilient plug which comprises an elastomeric tubular casing with a nosepiece across one end thereof and s solid wall across the second end thereof, an elastomeric foam filler positioned within said casing and at least one opening located in a wall of said casing other than in the solid wall across the second end thereof and wherein the central area of the said foam filler and solid wall is recessed to provide an annular flange positioned around the periphery of the said second end of said casing.

8. An improved pipe-cleaning resilient plug which comprises an elastomeric tubular casing with an essentially cylindrical outer wall, a nosepiece across one end thereof and a solid wall across the second end thereof, an elastomeric foam filler positioned within said casing and at least one opening located in the wall of said casing and at least one opening in said nosepiece to add to the flexibility and maneuverability of the plug.

9. An improved pipe-cleaning resilient plug which comprises an elastomeric tubular casing with a rounded nosepiece across one end thereof said nosepiece having at least one opening therein and a solid wall across the second end thereof, an elastomeric foam filler positioned within said casing and at least one opening located in a wall of said casing other than in the solid wall across the second end thereof.

Notice of Adverse Decision In Interference

In Interference No. 97,910 involving Patent No. 3,602,934, B. B. Reed, RESILIENT PLUG FOR CLEANING PIPELINES, final judgment adverse to the patentee was rendered Oct. 4, 1972, as to claims 1, 2, 3, 4, 5, 6, 7, 8 and 9.

[*Official Gazette January 16, 1973.*]